(12) United States Patent
Hawkins (10) Patent No.: US 7,830,246 B2
(45) Date of Patent: Nov. 9, 2010

(54) OCCUPANT SENSOR AND METHOD FOR SEAT BELT OR OTHER MONITORING

(75) Inventor: Eric T. Hawkins, Lawrenceville, GA (US)

(73) Assignee: Elesys North America, Inc., Suwanee, GA (US)

(*) Notice: Subject to any disclaimer, the term of this patent is extended or adjusted under 35 U.S.C. 154(b) by 1179 days.

(21) Appl. No.: 11/248,895

(22) Filed: Oct. 12, 2005

(65) Prior Publication Data

US 2008/0084290 A1  Apr. 10, 2008

(51) Int. Cl.
*B60Q 1/00* (2006.01)

(52) U.S. Cl. .................. 340/457.1; 340/425.5; 340/457; 701/45

(58) Field of Classification Search ............... 340/457.1, 340/425.5, 438, 457; 701/45
See application file for complete search history.

(56) References Cited

U.S. PATENT DOCUMENTS

| | | | | |
|---|---|---|---|---|
| 3,732,538 | A * | 5/1973 | Gillund et al. ........... | 340/457.1 |
| 4,885,566 | A * | 12/1989 | Aoki et al. ............... | 340/457.1 |
| 5,406,627 | A | 4/1995 | Thompson et al. | |
| 5,948,031 | A | 9/1999 | Jinno et al. | |
| 6,161,070 | A | 12/2000 | Jinno | |
| 6,329,913 | B1 | 12/2001 | Shieh et al. | |
| 6,329,914 | B1 | 12/2001 | Shieh et al. | |
| 6,407,706 | B2 * | 6/2002 | Vernon ................. | 343/700 MS |
| 6,509,747 | B2 * | 1/2003 | Nagai et al. ................. | 324/687 |
| 6,678,600 | B2 * | 1/2004 | Basir et al. ..................... | 701/45 |
| 6,696,948 | B2 | 2/2004 | Thompson et al. | |
| 6,816,077 | B1 | 11/2004 | Shieh et al. | |
| 2003/0151240 | A1 * | 8/2003 | Saitou et al. ................. | 280/735 |
| 2003/0204295 | A1 * | 10/2003 | Thompson et al. ............ | 701/45 |
| 2004/0069075 | A1 | 4/2004 | Jakoby et al. | |
| 2004/0111201 | A1 | 6/2004 | Thompson et al. | |
| 2004/0199318 | A1 | 10/2004 | Shieh et al. | |

(Continued)

FOREIGN PATENT DOCUMENTS

CA  2492006  7/2005

(Continued)

OTHER PUBLICATIONS

EP Search report and written opinion for co-pending case (European Patent Application No. 06255139.5).

(Continued)

*Primary Examiner*—George A Bugg
*Assistant Examiner*—Kerri McNally
(74) *Attorney, Agent, or Firm*—Brinks, Hofer, Gilson & Lione (57) ABSTRACT

An occupant sensor with a complex arrangement of antenna or a simple single antenna determines a charge or discharge characteristic of the antenna. By determining the change in voltage or current of the antenna as a function of time, any occupant may be detected or characterized. The sensor restricts air bag activation or is used for another purpose. The same or different occupant sensor is used for seat belt warnings. A seat belt latch sensor determines whether a seat belt is being used. The occupant sensor determines whether the seat belt should be used. A driver is warned when a seat belt should be used by an occupant, but is not.

29 Claims, 4 Drawing Sheets

U.S. PATENT DOCUMENTS

| | | |
|---|---|---|
| 2004/0232774 A1 | 11/2004 | Thompson et al. |
| 2005/0121885 A1 | 6/2005 | Shieh |
| 2006/0109091 A1* | 5/2006 | Rittmueller et al. .... 340/426.26 |
| 2009/0201163 A1* | 8/2009 | Decoster et al. ............. 340/667 |

FOREIGN PATENT DOCUMENTS

| | | |
|---|---|---|
| DE | 10 2005 002 843 A1 | 8/2005 |
| GB | 2 401 467 A1 | 11/2004 |
| GB | EP 1 669 249 A1 | 6/2006 |
| WO | WO 03/024749 A1 | 3/2003 |
| WO | WO 2005/102796 A1 | 11/2005 |

OTHER PUBLICATIONS

EP Search report and written opinion dated May 13, 2009 for co-pending case (European Patent Application No. 06255139.5).

* cited by examiner

OCCUPANT SENSOR AND METHOD FOR SEAT BELT OR OTHER MONITORING

BACKGROUND

The present invention relates to occupant detection. In particular, an occupant sensor and associated methods for detecting an occupant and using the detection are provided.

Occupant detection in conjunction with sensing a crash determines whether to activate an airbag. Various occupant detection systems have been proposed, including detection based on ultrasound, infrared, radar, electric field, capacitance, weight or combinations thereof. The occupant detection systems use antennas positioned in various locations within a vehicle, such as within a windshield, within a roof liner, in floor mats, or within a seat. The antennas are piezoelectric material, conductive materials, or other structures. For example, a conductive textile or flexible metallic electrode within a seat allows capacitive or electric field-based detection of an occupant. As another example, strain gauges or other associated pressure sensing sensors on flexible circuit material within a base portion of the seat detect an occupant.

To distinguish between different types of materials, such as an occupant and a bag of groceries, various sensing techniques have been developed. The change in frequency due to a different capacitance from multiple different antennas is one technique. Another technique is complex image processing. Classification from different types of data based on experimentation or neural network processes is another technique. Other techniques include determining electric field strength from different electrodes at different distances away from a seating area. However, these systems may be complex for distinguishing between multiple categories of occupant with reliable use with air bag systems.

BRIEF SUMMARY

By way of introduction, the preferred embodiments described below include methods, sensors and systems for detecting an occupant or characteristic and for seat belt monitoring. An occupant sensor with a complex arrangement of antennas or a simple single antenna determines a charge or discharge characteristic of the antenna. By determining the change in voltage or current of the antenna as a function of time, any occupant may be detected or characterized. The sensor restricts air bag activation or is used for another purpose.

The same or different occupant sensor is used for seat belt warnings. A seat belt latch sensor determines whether a seat belt is being used. The occupant sensor determines whether the seat belt should be used. A driver is warned when a seat belt should be used by an occupant, but is not.

In a first aspect, a sensor system is provided for seat belt monitoring. A processor generates a seat belt warning, in part, in response to detection of an occupant by an occupant sensor with an antenna. For example, electric field or capacitive based occupant sensors are used. The processor generates the warning also in response detection of lack of seat belt latching by the seat belt latch sensor.

In a second aspect, a method is provided for seat belt monitoring. Whether a seat belt is latched is detected. Whether an occupant is present is detected with an electric field. A seat belt warning is generated if the seat belt is not latched and an occupant is present.

In a third aspect, an occupant sensor is provided for detecting an occupant or characteristic. An antenna is positioned by an occupant space. A voltage or current source connects with the antenna. A measurement circuit is operable to measure a response on the antenna as a function of time to a first change in the voltage or current supplied by the voltage or current source.

In a fourth aspect, a method is provided for sensing an occupant. A change in voltage or current is applied to an antenna adjacent an occupant space. A response is measured as a function of time to the change of the voltage or current by the antenna. Any occupant is classified as a function of the response.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, m the figures, like reference numerals designate corresponding parts throughout the different views.

DETAILED DESCRIPTION OF THE DRAWINGS AND PRESENTLY PREFERRED EMBODIMENTS

A response of an antenna as a function of time to a change in voltage or current applied to the antenna is measured. The response, such as an integral of the discharge or charge characteristic of the antenna, maps to an occupant classification. Occupant classifications include no occupant, an occupant, an object (e.g., car seat), and/or occupants of particular sizes (e.g., 5% female or larger, 6 year old or larger or other groupings).

In one implementation of the occupant sensor, an undersampled electric field sensing circuit uses the response of a sensor to a step voltage to determine the sensor's lumped capacitance and resistance. A micro-controller excites the antenna. The micro-controller also contains an analog-to-digital controller to resolve voltage measured across the antenna. To minimize power consumption and cost, the micro-controller operates at a low frequency relative to the charge and discharge cycle and operates with a low ADC bandwidth. The discharge or charge waveform is digitized by aliasing the high frequency signal content into the pass-band of the converter using under-sampling.

The occupant sensor using the charge or discharge response or a different occupant sensor is used for seat belt monitoring or air bag activation limitation. For example, an electric field-based occupant sensor determines the presence of an occupant in a seat, such as distinguishing between occupants and items or distinguishing between 6-year-old size or smaller from larger sized occupants. A seat belt latch sensor determines whether the seat belt is being used. If the seat belt is not being used but an occupant is detected (e.g., 6 year old or larger size), a seat belt warning is generated.

Figure 1:
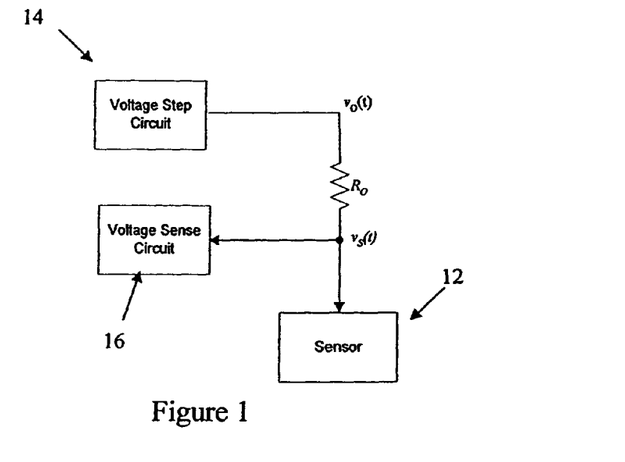
FIG. 1 is a block diagram of one embodiment of an occupant sensor for detecting an occupant.

FIG. 1 shows one embodiment of an occupant sensor for detecting an occupant or characteristic of an occupant or item. The occupant sensor includes a sensor or antenna 12, a voltage step circuit 14, a voltage sense circuit 16 and a series resistor $R_o$. Additional, different or fewer components may be provided. For example, additional resistors, capacitors or inductors are included. As another example, current step and sensing circuits are used instead of or in additional to voltage. As another example, the voltage step circuit 14 operates more gradually on charge or discharge. More than one antenna 12 with a multiplexer or additional circuits 14, 16 may be used.

The antenna 12 is an electrode, loop conductor, patterned conductor, linear conductor or other now known or later developed antenna. Single layer or multiple layers antennas may be used. In one embodiment, the antenna 12 is a single loop antenna, but nested or separate transmit and receive antennas may be used.

The antenna 12 is positioned by an occupant space. For example, the antenna is positioned in a window, on a steering wheel, on a dashboard, in a seat, on a seat back, in a seat base, on a floor or other location in a vehicle. A same antenna 12 may extend into multiple of these locations, or multiple antennas 12 may be provided for different locations. In one embodiment, a single antenna 12 is positioned in a seat base or a seat back on a surface adjacent the occupant space, such as beneath the fabric at a location likely positioned by the buttocks or lower back of a normally seated adult occupant. For example, the antenna 12 is on or in a base portion of a vehicle seat adjacent the occupant space and adjacent to a back of the vehicle seat. The seat is a passenger, driver, bench, bucket or other seat of a vehicle. Seats in other settings, such as seats at a movie theater, may be used.

The voltage step circuit 14 is a voltage or current source connected with the antenna 12. The voltage step circuit 14 is a waveform generator, such as a transistor or switch with a power source, digital-to-analog converter or other now known or later developed device for applying a change in voltage or current to the antenna 12. The voltage step circuit 14 outputs only a single step. Alternatively, the change in voltage or current repeats, such as applying an ongoing square wave. In one embodiment, the voltage step circuit 14 is a transistor for generating a unipolar square wave between 0 and 5 volts. Greater or lesser amplitude, and/or non-square waves (e.g., sinusoidal) may be used.

In one embodiment, the increasing voltage portion of each pulse in a pulse train is different from a decreasing portion of the pulses. For example, the increasing voltage is gradually changed in magnitude to limit electromagnetic interference. The discharge portion is a step. Alternatively, both the rising and falling portions are gradual, or the rising portion is a step and the falling portion is gradual.

The voltage sense circuit 16 is an analog-to-digital converter and a processor or other now known or later developed voltage or current measurement circuit. In one embodiment, the voltage sense circuit 16 is a micro-controller also used for the voltage step circuit 12. For example, the voltage sense circuit 16 has an analog-to-digital converter (ADC) channel, an internal oscillator, and low power consumption. The circuit may be powered from a RS232 serial port or other port. The output drive capability of the microcontroller is sufficient to provide a charging pulse to a capacitive load. For the ADC, the reference used is an external voltage supply sourced by a linear regulator. Other micro-controllers may be used with the same or different characteristics. Alternatively, separate devices are provided. For example, an external oscillator is provided. As another example, an external voltage source is the ADC reference.

The voltage sense circuit 16 includes an occupant detection circuit operable to detect an occupant. In the embodiment of the voltage sense circuit 16 as a processor, the processor characterizes or classifies the occupant as a function of the sensed voltage or current. In an alternative embodiment, a separate processor or micro-controller is provided for characterizing or classifying the state of the seat (e.g., occupied, occupied by a person, occupied by a 6 year old or larger person).

The voltage sense circuit 16, voltage step circuit 14 and/or antenna 12 are on a circuit board or flexible circuit material, or may be connected together with cables. Where capacitance is measured, the capacitance from any ground plane in the occupant sensor is subtracted from the final value. A metal box or other structure may be used to house the occupant sensor circuits 14, 16, but plastic, potting, no housing or other housing materials may be provided. In one embodiment, copper traces and fills adjacent an interface are eliminated or reduced. The occupant sensor is guard-banded. A surface mount, flip chip, or other mounting is used for the components.

Figure 2:
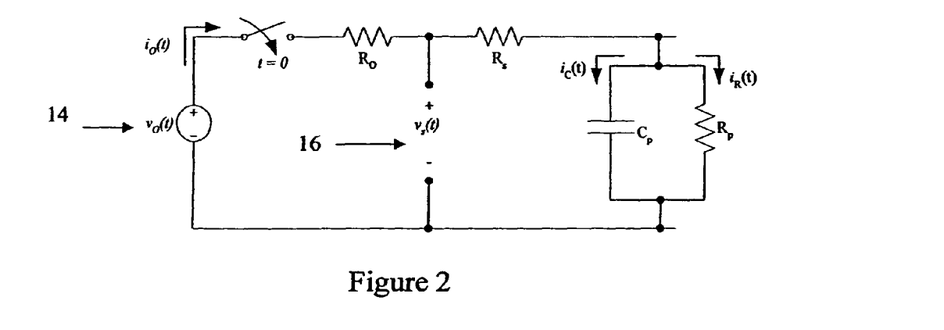
FIG. 2 is a circuit model of an occupant sensor in one embodiment.

FIG. 2 shows a model of the occupant sensor of FIG. 1. $V_o$ is the excitation voltage from the voltage step circuit 14. $R_o$ is the excitation series resistance. $R_s$ is the lumped series resistance of the circuit minus sensor and excitation source. $R_p$ is the lumped parallel resistance of the sensor. $C_p$ is the parallel capacitance of the sensor. $V_s$ is the measured response of the sensor. The voltage sense circuit 16 measures $V_s$. A general expression for capacitance as seen by the sensor is:

$$C = \frac{v_o(t) - v_s(t)}{\frac{dv_s(t)}{dt}(R_o + R_s)}$$

Other expressions of the capacitance may be used. Other models of the occupant sensor may be used.

The response of the antenna 12 is a function of capacitance of the antenna 12. For example, the antenna 12 with or without an occupant has a capacitive load of less than 200 pF. To distinguish between different loads adjacent the antenna 12, the voltage sense circuit 16 resolves changes in capacitance to 1 pF, but other greater or lesser capabilities may be provided. The range of capacitance values is proportional to the delay loop implemented by the system. An upper bound may be approximately 150 pF, and a lower bound may be approximately 3 fF. These values are a function of the microcontroller firmware, number of cycles per instruction and internal clock speed of the microcontroller, so other values may be used.

The voltage sense circuit 16 classifies as a function of a response of the antenna 12 to a change in voltage or current. The voltage sense circuit 16 is a measurement circuit operable to measure a response on the antenna 12 as a function of time to a first change in the voltage or current supplied by the voltage or current step circuit 14. For example, the voltage step circuit 14 applies a step in the voltage, such as a rising or falling edge of a square wave. In response to the change in the applied voltage or current, the voltage or current on the antenna 12 changes or varies. The rate of change varies as a function of time based on the capacitance.

Figure 3:
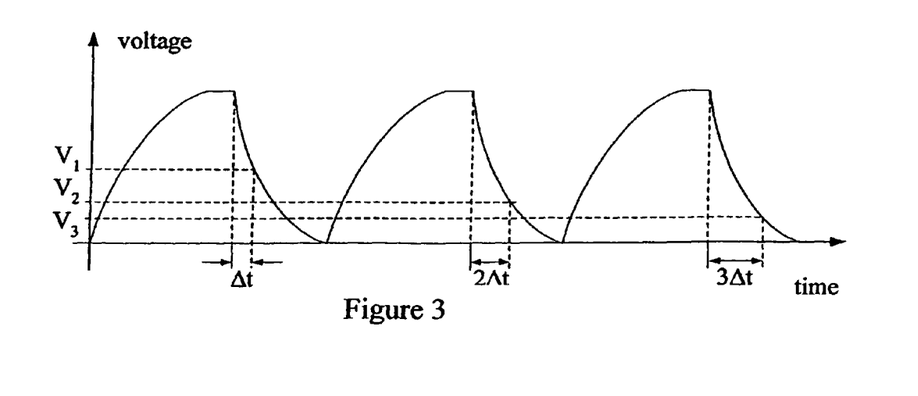
FIG. 3 is a graphical representation of one embodiment of measuring voltage response of an antenna as a function of time.

FIG. 3 shows a voltage of the antenna 12 through three cycles of an applied square wave. The change in voltage is generally exponential due to the capacitance. The capacitance causes gradual voltage variation in response to the more sudden change in applied voltage. The change is voltage is measured. For example, the change in voltage as the voltage increases (charging voltage) is measured. As another example, the change in the voltage as the voltage decreases (discharging voltage) is measured. Effects of noise due to power-supply may be reduced by measuring the discharge edge of the waveform. Both charging and discharging voltages of the antenna 12 may be measured. Alternatively, current charging and/or discharging are measured.

In one embodiment, the change is measured during a single cycle. Other measurements from other cycles may be averaged or filtered. In another embodiment, the measurement circuit samples the change over repetitions of the applied voltage cycle to account for low bandwidth measuring devices. FIG. 3 shows under sampling of the voltage waveform across the capacitance of the antenna 12. In time, each sample is taken at $T+(\Delta t \times n)$, and the corresponding voltage at that point is measured and stored. When reconstructed, each n data point is separated in time by only $\Delta t$ relative to the beginning of charge or discharge. The data points from multiple cycles represent one complete waveform of length T. The voltage is quantified with reduced bandwidth requirements, resulting in increased sensitivity to smaller capacitance values.

Any change characteristic may be used. For example, a difference in voltage at two or more different times indicates the occupant state. A derivative of the change, a rate of change, a value at a particular time relative to the cycle and/or other characteristic of the charging or discharging response of the antenna 12 is used. In one embodiment, the measurement circuit or voltage sense circuit 16 integrates the change as a function of time on the antenna. The area under the reconstructed charge or discharge waveform may be less sensitive to the effects of noise than other characteristics. The area is computed as the integral using standard numerical techniques such as the simplified trapezoidal rule with an arbitrary unit time step. Other integration techniques may be used. The discharge, charge or both discharge and charge are integrated. Combinations of change characteristics may be used. The characteristics may be filtered.

Figure 4:
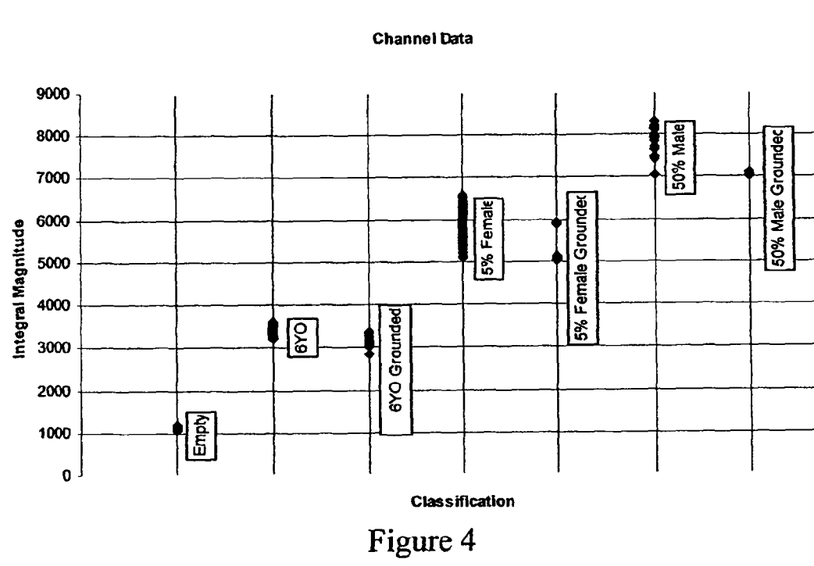
FIG. 4 is a graphical representation of an embodiment of classification of an occupant based on measured antenna response.

A processor, such as the voltage sense circuit 16, characterizes the occupant as a function of the response of the antenna 12. Different values of the response characteristics may indicate different occupant classifications. For example, FIG. 4 shows different values of the integral of discharge for an antenna 12 positioned in a seat base near the back. The data space is in a measurement domain or scales as a function of the cycle time or measurement increment. An absolute time scale may be used. The values distinguish between any two or more occupant states, such as distinguishing empty from all other states. The values may distinguish between different size ranges of occupants, such as distinguishing empty and six year old or younger size from larger sizes. Data clustering techniques group data points and segregate information based on observations with respect to occupant classification. More than one type of value may be included. In FIG. 4, the grounded state corresponds to the occupant touching a grounded object in the vehicle. The non-grounded state corresponds to the occupant being free of direct contact with a grounded object in the vehicle.

The data prior to classification or classification may be filtered. In one embodiment, the judgment lock or other filtering disclosed in U.S. Pat. No. 7,065,438 (Publication No. 2003-0204295), the disclosure of which is incorporated herein by reference, is used. Alternatively, additional filtering or judgment lock is not provided.

Figure 5:
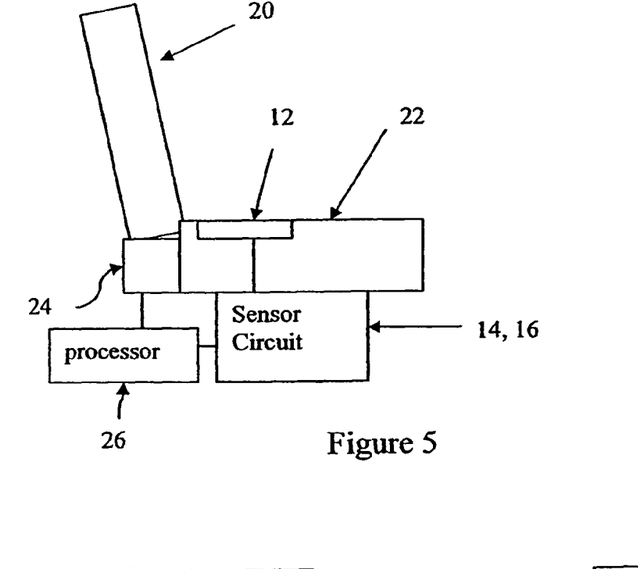
FIG. 5 is a graphical representation of one embodiment of a vehicle seat with an occupant sensor.
Figure 6:
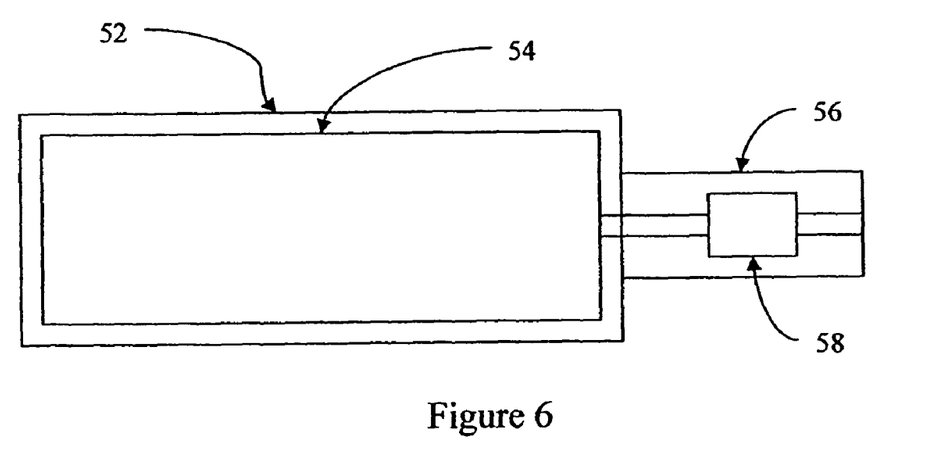
FIG. 6 is a top view of one embodiment of an antenna and circuit for occupant sensing.

FIG. 5 shows the occupant sensor in a seat 20 of an automotive vehicle. The sensor circuits 14, 16 are on a circuit board. Alternatively, a flexible circuit is used. FIG. 6 shows one embodiment integrating the antenna 12 and sensor circuits 14, 16 as a flexible circuit positioned in the seat 20. The antenna 12, voltage step circuit 14 and/or the voltage sense circuit 16 may be implemented on different circuit boards or flexible circuits.

The flexible circuit includes a flexible film 52. The flexible film 52 is flexible circuit material, such as a Polyimide (Kapton®) film, PET Polyester (Mylar®) film, PEN Polyethylene Napthalate or other now known or later developed flexible materials for use as a flexible circuit substrate. The flexible circuit material may have active or passive electrical circuit components integrated on the material, or the flexible film 52 is free of active and/passive components.

The flexible film 52 has one or more antennas 54 and associated signal traces formed on the material. The antennas 54 are copper, conductive electrodes, strain gauges, pressure sensors, radio frequency antennas, piezoelectric films, semiconductor film based diodes or light detectors, combinations thereof or other now known or later developed sensors for detecting a presence or characteristic of an occupant. The antenna 54 is for use with capacitance or electric field or capacitance based sensing, but weight or other sensors may be used.

The antennas 54 are used by the sensor circuits 58. The sensor circuits 58 are formed as a flexible circuit on a tail 56 of the flexible circuit material 52. The signal traces connect the antenna loop 54 or antenna area with the sensor circuits 58. The traces are of a same or different material as the antenna loop 54, such as both being deposited, etched or form rolled annealed copper or other flexible metallic or conductive material.

The tail 56 is of any length, such as from a few inches to a yard. The antenna loop 54 is within the seat 20. The tail 56 extends from the antenna loop 54 to a connector and location for connection to other processors or devices, such as an air bag processor or a seat belt warning light. For example, the tail 56 extends for connection under a seat.

The flexible film 52 is a solid material, but may include apertures in sections apart from or including the antennas 54. For example, one or more apertures allow for greater flexibility, airflow, water drainage or may be provided for other purposes. For example, the apertures more easily allow the flexible film 52 to conform to the molded structure of a seat.

Additional components may form on or connect to the flexible material 10. For example, a temperature, humidity or both temperature and humidity sensor connect with the flexible material 52 or are integrated as part of the sensor circuits 58. In one embodiment, one of the additional sensors disclosed in U.S. Pat. No. 6,816,077 is provided.

In alternative embodiments, the sensor circuits 58 are on a separate circuit board, such as a 2-layer circuit board. Two layer flexible circuits may also be provided. One layer acts as a dedicated ground plane. The ground plane also provides a low transfer impedance ground structure to which outgoing communication lines are decoupled at RF. Alternatively, no ground plane or other shielding is used.

The occupant sensor is used for air bag control. For example, the air bag is prevented from deployment for small children, small adults, and/or inanimate objects. In another embodiment, the occupant sensor is a sensor system for seat belt monitoring. FIG. 5 shows one embodiment for seat belt monitoring. The seat 20 includes an occupant sensor (antenna 12 and sensor circuits 14, 16), a seat belt latch sensor 24, and a processor 26. Additional, different or fewer components may be provided.

The seat belt latch sensor 24 is a conductive switch sensor. If the metal latch of the seat belt is inserted or latched, a conductive path is formed. If the metal latch is not inserted, an open circuit is formed. The seat belt latch sensor 24 senses the conductive path or open circuit based on voltage or current through the seat belt latching device. Other now known or later developed seat belt latch sensors 24 may be used.

The occupant sensor includes an antenna 12. The antenna 12 is for electric field, capacitive, other radio frequency based sensing, infrared, optical, acoustic or other transmitted field sensing. For example, the occupant sensor includes the antenna 12 and the sensor circuits discussed above for FIG. 1, 2, 3 or 4. In other embodiments, the voltage sense circuit 16 is a processor, amplifier, filter, applications specific integrated circuit, field programmable gate array, digital component, analog component, combinations thereof or other now known or later developed devices for determining a presence or characteristic of an occupant. For example, the occupant sensor uses pattern recognition or other processes for optical, acoustic or infrared sensing. In another example, one of the occupant detection circuits disclosed in U.S. Pat. Nos. 5,406,627, 5,948,031, 6,161,070, 6,329,913, 6,329,914, 6,816,077, and 6,696,948, the disclosures of which are incorporated herein by reference, is used. The effect of an occupant on an electric field is used to determine the presence or other characteristic of an occupant, such as a human or an inanimate occupant. The loading current or other values associated with the transmission of radio frequency waves are used to determine the occupant information. Alternatively, the transmission from antenna 12 and reception at other antennas is used. Other electric field or capacitive sensing circuits may be used, such as a circuit for determining a capacitance, a frequency change, current level, voltage level or other characteristic of an occupant effect on an electric field or a capacitance value.

The occupant sensor distinguishes between occupants and inanimate objects. The occupant sensor may distinguish between other classifications, such as between occupants of at least two different sizes. Distinctions in position, height, posture, weight, head location, or other characteristics of an occupant may be used additionally or alternatively.

The processor 26 is a processor of the sensor circuit 14, 16, the seat belt latch sensor 24 or a separate processor. For example, the processor 26 is a general processor, digital signal processor, application specific integrated circuit, field programmable gate array, digital circuit, analog circuit or other now known or later developed device for generating a warning signal as a function of inputs. The processor 26 generates a seat belt warning in response to detection of an occupant by the occupant sensor and detection of lack of seat belt latching by the seat belt latch sensor. For example, the occupant sensor detects an occupant in a rear seat of a vehicle, but the seat belt latch sensor does not detect use of the sea belt in the rear seat position. An audible or visual indication warns the driver and/or the detected occupant. The warnings may be for any of the seating locations in the vehicle.

The seat belt warning may distinguish between occupants of different sizes. For example, a seat belt warning is not generated for occupants of a six year old or smaller size. A car seat may use a latch system rather than a seat belt, so a seat belt warning is avoided for occupants small enough to be in a car seat. The distinction may be different for different seating locations, such as no size distinction for a driver or front passenger seat locations.

Figure 7:
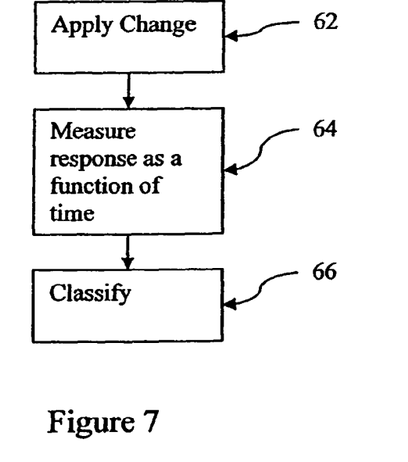
FIG. 7 is a flow chart diagram of one embodiment of a method for sensing an occupant.

FIG. 7 shows a method for sensing an occupant. Additional, different or fewer acts may be used. The acts are performed in the order shown or a different order.

In act 62, a change in voltage or current is applied to an antenna adjacent an occupant space. A step or more gradual change is applied. For example, a source of voltage or current is connected to or disconnected from the antenna. As another example, a waveform generator applies a waveform with a change in voltage or current amplitude. The change is an increase or a decrease, such as reducing a voltage or current applied from a waveform generator. The change may be repeated, such as applying a square wave. In one embodiment, the addition or increase in voltage or current is performed gradually to avoid electromagnetic interference. After gradually charging the antenna, the voltage or current is more rapidly removed, discharging the antenna more rapidly than charging the antenna. In other embodiments, the discharge is more gradual, both charging and discharge are rapid or a step function, or both charging and discharging are gradual.

In act 64, a response of the antenna is measured as a function of time. The response is to the change of the voltage or current applied to the antenna. Due to the capacitance associated with the antenna, the voltage or current of the antenna changes more gradually or differently than the applied waveform. The capacitance of the antenna is a function of the adjacent load. The antenna acts as one capacitive plate and the vehicle or other conductor acts as the ground plate. By measuring the voltage or current on the antenna as a function of time, the effects of any occupant adjacent to the sensor are measured. For example, the discharge response or characteristic of the antenna is measured. The characteristic as a function of time indicates one or more characteristics of any occupant.

In one embodiment, the response for each change is measured during one change. In other embodiments, the response is sampled over multiple repetitions of the change to determine the response.

The response is measured as a voltage or current. Capacitance, resistance or other property may be measured. The measurement indicates the occupant state. Alternatively, the response is calculated from the measurements. For example, the area of the charge or discharge response is calculated. Integrating the response as a function of time can reduces the effects of noise.

In act 66, any occupant is classified as a function of the response. Thresholds, pattern matches, distributions of multiple measurements, distributions of multiple types of measurements, distributions of multiple different calculations, or combinations thereof distinguish between two or more occupant states. For example, a raw or average area of the discharge characteristic distinguishes between at least two size ranges of occupants based on a threshold.

Figure 8:
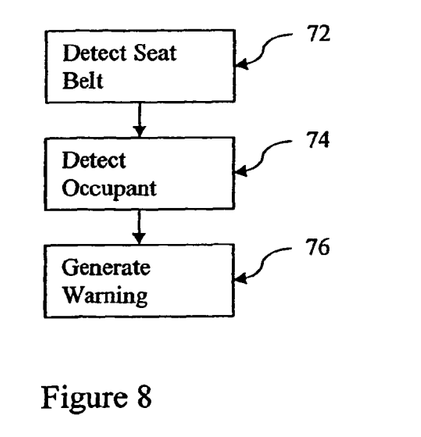
FIG. 8 is a flow chart diagram of one embodiment of a method for seat belt monitoring.

FIG. 8 shows a method for seat belt monitoring. Using the method of FIG. 7, a seat belt warning is generated as a function of the classification. Other occupant detection methods may be used. Additional, different or fewer acts than shown in FIG. 8 may be used. The acts are performed in the order shown or a different order. For example, act 74 is performed before or substantially simultaneously with act 72.

In act 72, whether a seat belt is latched is detected. A seat belt sensor detects through conductivity or other sensing whether a seat belt is latched, extended, or fastened. In act 74, whether an occupant is present is detected with an electric field. Capacitance, current draw, optical or other electric field based sensing may be used. Alternatively, acoustic or weight sensors are used. The occupant detection distinguishes between inanimate objects and humans and/or between at least two size ranges of occupants. In act 76, a seat belt warning is generated if the seat belt is not latched and an occupant is present. For example, an audible alarm and/or visual indication are generated for one size range of occupants and not for another size range.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A sensor system for seat belt monitoring, the sensor system comprising:
   a seat belt latch sensor;
   an occupant sensor with an antenna, wherein the antenna comprises an only single antenna of the occupant sensor; and
   a processor operable to generate a seat belt warning in response to detection of an occupant by the occupant sensor and detection of lack of seat belt latching by the seat belt latch sensor;
   wherein the occupant sensor is operable to distinguish between human occupants of at least two different sizes, the processor operable to allow generation of the seat belt warning for one and avoid generation of any seat belt warning for another of the at least two different sizes;
   wherein the occupant sensor comprises an electric field or capacitive sensor, wherein the occupant sensor comprises an occupant detection circuit, the occupant detection circuit operable to detect the occupant as a function of a response of the antenna to a change in voltage or current, wherein the change in voltage or current is a change in discharge voltage or current.

2. The sensor system of claim 1 wherein the antenna is on or in a seat.

3. The sensor system of claim 2 wherein the antenna is adjacent a seating surface on a base of the seat.

4. The sensor system of claim 1 wherein the occupant sensor comprises a waveform generator operable to apply a gradually increasing voltage or current magnitude to the antenna and comprises the occupant detection circuit operable to mathematically integrate a voltage or current discharge.

5. A method for seat belt monitoring, the method comprising:
   detecting whether a seat belt is latched;
   detecting, with an antenna on or in a seat, whether a human occupant is present with an electric field, wherein the antenna is an only antenna for detecting the human occupant of a seating area; and
   generating a seat belt warning if the seat belt is not latched and the occupant is present;
   wherein detecting whether the human occupant is present comprises distinguishing between at least two size ranges, positions, or both of human occupants, and wherein generating the seat belt warning comprises allowing generating the seat belt warning for one of the size ranges or positions and avoiding generating any seat belt warning for another of the size ranges or positions;
   wherein detecting whether the human occupant is present comprises applying a gradually increasing voltage magnitude to the antenna until the antenna is fully charged, removing the voltage source and measuring a voltage discharge characteristic of the antenna.

6. The method of claim 5 wherein detecting whether the seat belt is latched comprises detecting with a seat belt sensor.

7. The method of claim 5 wherein detecting with the antenna comprises detecting with the antenna adjacent a seating surface on a base of the seat.

8. The method of claim 5 wherein detecting whether the occupant is present comprises measuring a change in voltage or current.

9. An occupant sensor for detecting an occupant or characteristic, the occupant sensor comprising:
   an antenna positioned by an occupant space;
   a voltage or current source connected with the antenna; and
   a measurement circuit operable to measure a response on the antenna as a function of time to a first change in the voltage or current supplied by the voltage or current source;
   wherein the response is a second change in voltage or current on the antenna as a function of time and the measurement circuit is configured to measure the second change at different times relative to an occurrence of the first change as the second change occurs due to the first change, the second change happening more slowly than the first change.

10. The occupant sensor of claim 9 further comprising:
    a processor operable to characterize the occupant as a function of the response.

11. The occupant sensor of claim 9 wherein the antenna comprises a flexible circuit material in a seat.

12. The occupant sensor of claim 9 wherein the antenna, voltage or current source and measurement circuit comprises a flexible circuit.

13. The occupant sensor of claim 9 wherein the antenna is on or in a base portion of a vehicle seat adjacent the occupant space and a back of the vehicle seat.

14. The occupant sensor of claim 9 wherein the second change in voltage or current on the antenna comprises a discharge of the antenna.

15. The occupant sensor of claim 9 wherein the voltage or current source is operable to repeat the first change, and wherein the measurement circuit is operable to sample the second change over repetitions of the first change.

16. The occupant sensor of claim 9 wherein the measurement circuit is operable to integrate the second change as a function of time.

17. The occupant sensor of claim 9 wherein the voltage or current source is operable to apply a gradually increasing voltage magnitude to the antenna and more rapidly discharge the voltage, and wherein the measurement circuit is operable to measure a voltage discharge characteristic of the antenna.

18. The occupant sensor of claim 10 wherein the processor is operable to distinguish between at least two size ranges of occupants.

19. The occupant sensor of claim 10 wherein the processor is operable to generate a seat belt warning as a function of the characterization.

20. A method for sensing an occupant, the method comprising:

applying a first change in voltage or current to an antenna adjacent an occupant space;

measuring a response as a function of time to the first change of the voltage or current by the antenna wherein the response is a second change in voltage or current on the antenna as a function of time; and classifying any occupant as a function of the response based on a difference between measurements of the second change at different times during the second change.

21. The method of claim 20 wherein applying and measuring comprise applying and measuring with the antenna in a vehicle seat.

22. The method of claim 20 wherein measuring the response comprises measuring a voltage or current on the antenna as a function of time.

23. The method of claim 20 wherein applying the first change comprises reducing the voltage or current applied from a waveform generator and wherein measuring the response comprises measuring a discharge of the antenna.

24. The method of claim 20 further comprising repeating application of the first change, wherein measuring comprises sampling the response over repetitions of the change.

25. The method of claim 20 wherein measuring comprises integrating an area for the response as a function of time.

26. The method of claim 20 further comprising:
charging the antenna gradually;
wherein applying comprises more rapidly discharging the antenna, and wherein measuring comprises measuring a voltage discharge characteristic of the antenna.

27. The method of claim 20 wherein classifying comprises distinguishing between at least two size ranges of occupants.

28. The method of claim 20 further comprising:
generating a seat belt warning as a function of the classification.

29. An occupant sensor for detecting an occupant or characteristic, the occupant sensor comprising:
an antenna positioned by an occupant space;
a voltage or current source connected with the antenna; and
a measurement circuit operable to measure a response on the antenna as a function of time to a first change in voltage or current supplied by the voltage or current source;
wherein the first change is a step in voltage or current and the response is a discharge, and the measurement circuit is operable to measure at different relative times after the discharge.

* * * * *